Sept. 22, 1953  O. C. WALLEY ET AL  2,653,256
ELECTRIC MOTOR BRAKE COUPLING ASSEMBLY
Filed Aug. 4, 1951  3 Sheets-Sheet 1
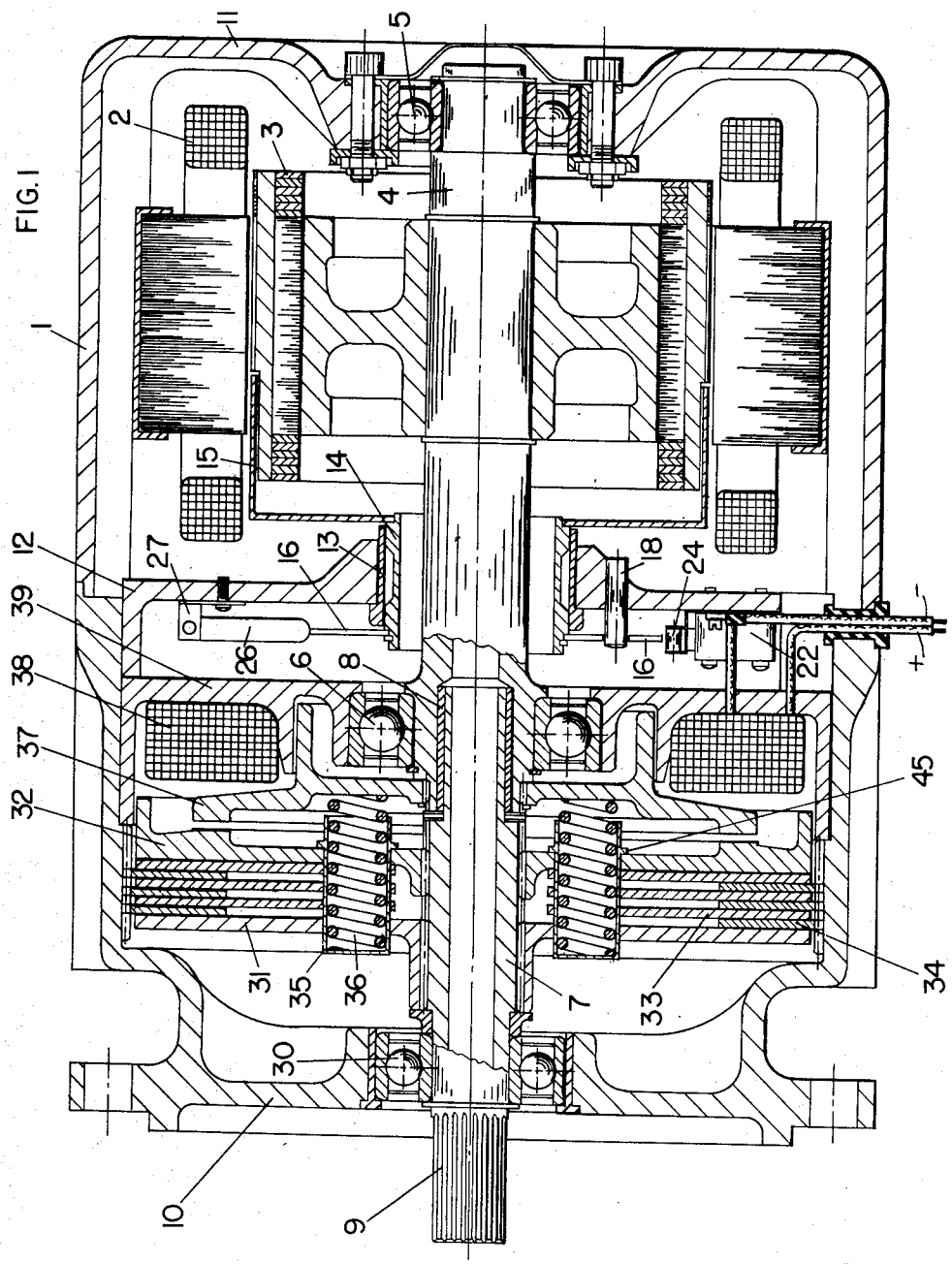
INVENTORS
OMAR C. WALLEY
BY ROBERT L. ANDERSON
ATTORNEY Sept. 22, 1953     O. C. WALLEY ET AL     2,653,256
ELECTRIC MOTOR BRAKE COUPLING ASSEMBLY
Filed Aug. 4, 1951                              3 Sheets-Sheet 2
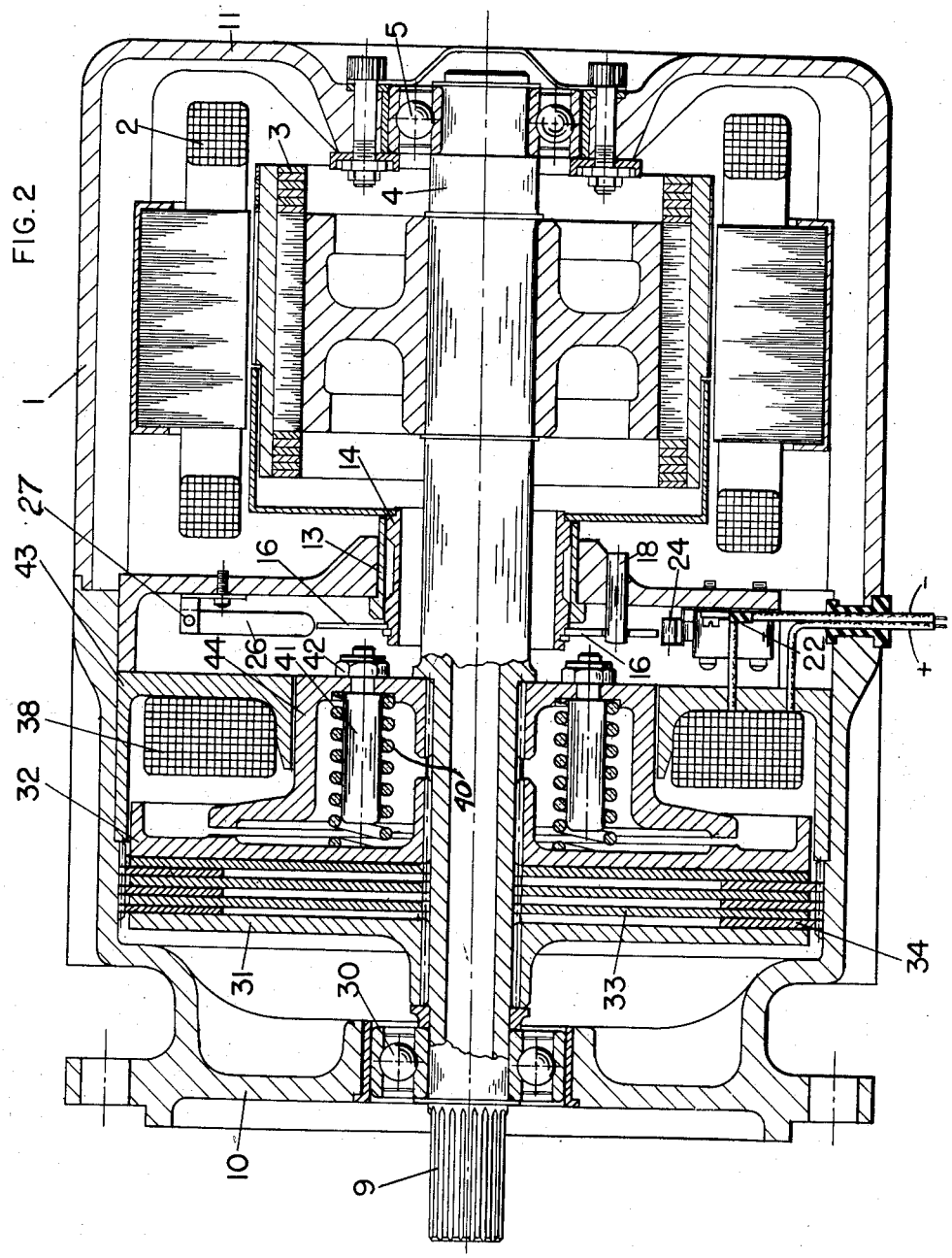
INVENTORS
OMAR C. WALLEY
BY ROBERT L. ANDERSON
ATTORNEY Sept. 22, 1953     O. C. WALLEY ET AL     2,653,256
ELECTRIC MOTOR BRAKE COUPLING ASSEMBLY Filed Aug. 4, 1951                               3 Sheets-Sheet 3

INVENTORS
OMAR C. WALLEY
BY ROBERT L. ANDERSON

ATTORNEY

Patented Sept. 22, 1953

2,653,256

UNITED STATES PATENT OFFICE 2,653,256

ELECTRIC MOTOR BRAKE COUPLING
ASSEMBLY

Omar C. Walley, Cleveland, and Robert L. Anderson, Maple Heights, Ohio, assignors to Jack & Heintz Precision Industries, Inc., Cleveland, Ohio, a corporation of Delaware Application August 4, 1951, Serial No. 240,392

5 Claims. (Cl. 310—76)

This invention relates to automatic means for controlling and regulating the release and application of braking means upon a motor driven rotary shaft.

One of the primary objects of the invention is to provide a motor driven actuator including a brake for normally engaging the rotary actuator shaft together with means whereby the brake will be quickly released upon manual control to start the motor and whereby the brake will also be quickly reapplied automatically upon stopping of current supply to the motor in order to avoid coasting of the shaft so as to enable proper adjustment of the device being actuated.

Another object is to provide in combination with a brake that is spring urged to normally brake the actuator output shaft, a motor, and an electromagnet, which when energized upon supply of current to the motor, will act simultaneously as a brake release and a magnetic coupling as a drive between the motor and the actuator output shaft.

Another object is to provide a switch control means that will be operated upon starting of the motor to supply current to energize the electromagnet.

A further object is to provide in such an assembly a motor and an electrical means actuated by the starting of the motor for closing a switch to energize the electromagnet which releases the brake and constitutes a magnetic drive between the motor and the actuator output shaft only so long as the motor current is supplied.

To accomplish these objects it is proposed to provide a friction disc brake normally spring pressed to brake the actuator output shaft. It is further proposed to employ an A. C. motor having a rotor and a stator. Interposed between the rotor and stator is a drag cup in spaced relation to both. Upon starting the A. C. motor certain electrical phenomena occur, such as eddy currents, between the stator and drag cup, the effect of which is to rotate the drag cup. The device also includes a D. C. current electromagnet including coils and a slidable armature that is normally spring pressed to apply the brake. The drag cup carries a cam normally spring biased in neutral position and limits are provided for its rotative movements in both directions. Upon starting the A. C. motor the cam actuates a microswitch to energize the electromagnet to slidably move the armature to release the brake against the action of the spring and effect a magnetic coupling between the motor and the actuator output shaft. The brake is automatically reapplied and the magnetic coupling disengaged quickly upon stopping of current supply to the A. C. motor.

With the foregoing and other objects in view the invention resides in the combination of parts and in the details of construction hereinafter set forth in the following specification and appended claims, certain embodiments thereof being illustrated in the accompanying drawings, in which:

Figure 1 is a view in longitudinal section of one form the invention may take in which a split shaft is used;

Figure 2 is a similar view of a modified form employing a solid piece shaft;

Figure 4:
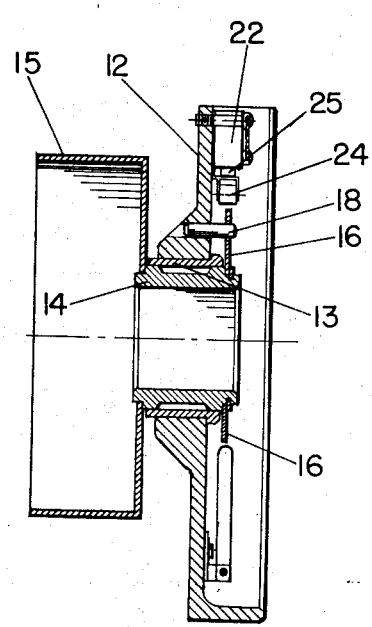
Figure 4 is a view in cross section taken through that shown in Figure 3.
Figure 3:
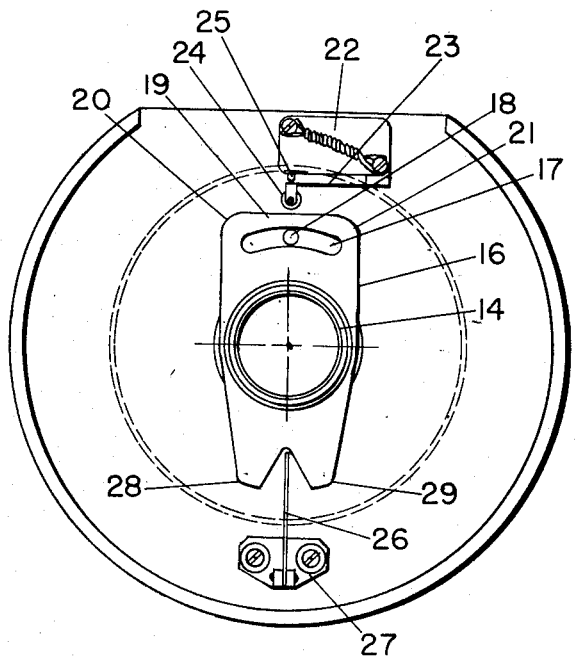
Figure 3 is an enlarged detail view of the drag cup, cam and cam actuated microswitch.

Referring more particularly to the drawings, the device as shown in Figure 1 comprises a housing 1, an A. C. motor including a stator 2 and a rotor 3 carried by a motor supporting shaft 4 rotatably mounted in bearings 5 and 6. Coextensive with shaft 4 and in non-driving relationship is another shaft 7 having a reduced end 8 rotatably supported in a recess in shaft 4 in line with bearing 6 and having its own bearing at 30. The output end of shaft 7 is splined at 9.

Intermediate the two end walls 10 and 11 of housing 1 is a centrally apertured wall 12 carrying a bearing sleeve 13 for a hollow sleeve 14 that surrounds shaft 4 with appreciable clearance. Sleeve 14 is a rigid part of a drag cup 15 that is annularly spaced with clearance between the rotor 3 and stator 2 of the A. C. motor. Rigidly secured to sleeve 14 is a cam plate 16. Cam 16 is provided with an arcuate slot 17 to receive a stationary pin 18 secured to housing wall 12 to form a limit stop means for the cam 16. Cam plate 16 has a slightly concave surface 19 with two spaced convex surfaces 20 and 21 on either side of surface 19. A microswitch is generally indicated by its casing 22 and includes a pivoted arm 23 having a roller 24. The microswitch also includes a spring plunger 25. The microswitch is driven in open position with the plunger undepressed and the roller spaced from the concave surface of the cam. The cam is spring biased into this position by a leaf spring 26 secured to a bracket 27 carried by housing wall 12, the leaf spring bearing upon the nadir of the space between the two legs 28 and 29 of cam 16.

The device also includes a braking mechanism for the output shaft 7. This includes two end plates 31 and 32 longitudinally splined to and axially movable on shaft 7 and carrying a series of friction brake discs 33 and alternately arranged brake discs 34, the latter of which are splined to the housing. End plates 31 and 32 also carry a sleeve 35 with its forward end closed to enclose a compression coil spring 36. The other end of coil spring 36 bears upon a non-permanent magnet 37 that is longitudinally splined to shaft 4. An electromagnet coil 38 is housed in housing member 39. The normal action of spring 36 is to maintain the friction brake discs compressed through a shoulder 45 on sleeve 35 bearing on slidable magnetic plate 32 splined to output shaft 7 so as to maintain the output shaft 7 braked against rotation. However, when power is applied to the A. C. motor by suitable manual switch control the windings set up a rotating field in the air gap so that the rotor rotates. Upon rotation of the rotor, eddy currents are generated in the drag cup which currents react with the rotating field, thus causing the drag cup 15 and its cam 16 to be rotated against the action of leaf spring 26 within the limits prescribed by the pin 18 in slot 17. As this occurs, and depending upon the direction of rotation of the drag cup, the switch plunger roller 24 is engaged by cam lobe 20 or 21, depressing plunger 25 and actuating microswitch 22. This supplies D. C. current from a suitable source to energize the electromagnet to cause plate 32 to slide to the right as the armature of a solenoid against the action of spring 36 to release the compression of the brake discs and to release the brake on output shaft 7.

Moreover, as slidable plate 32 moves to the right, to a suitable limit stop, not shown, to release the compression on the brake discs, it is magnetically attracted by magnet 37 of the electromagnet which has been energized by the closing of microswitch 22 by the cam 16. Magnet 37 is splined to motor supporting shaft 4 and there is no mechanical drive between motor supporting shaft 4 and the output shaft 7. The magnetic attraction between plates 37 and 32 constitutes a magnetic coupling and the only drive between motor supporting shaft 4 and the output shaft 7. This continues only so long as power is applied to the A. C. motor. When current supply to the stator of the A. C. motor is cut off, the spring 26 again centers the cam and opens the microswitch to deenergize the magnet. The spring 36 then takes over to once again apply the brake to output shaft 7 and disengage the magnetic coupling.

In Figure 2, only one shaft 4 is employed as a common motor supporting an output shaft. The same motor, drag cup, cam and microswitch are employed. The same general friction disc brake assembly is also employed with the exception of a compression coil spring 40 carried by a bolt 41 connected to a plate 43 by a nut 42. The spring 40 acts to normally compress the brake discs to apply the brake to the common motor shaft and output shaft. As the microswitch 22 is operated by the drag cup and cam upon starting the A. C. motor the electromagnet coil 38 in cage 43 is energized and the armature 32 is moved to the right against the action of spring 40 to release the brake on shaft 4 and establish a magnetic coupling drive between magnet 37 and plate 32. In this arrangement, when the output portion of the shaft is braked the motor rotor supporting portion of the shaft is simultaneously braked.

In either event there is provided a friction disc brake for the output portion of the rotary actuator shaft which brake is normally spring pressed to apply the brake. Part of the brake assembly is a solenoid that is normally deenergized. When it is desired to rotate the actuator shaft, power is supplied to the A. C. motor to start the same. The effect of the electrical phenomena on the drag cup is to rotate it within prescribed limits, against the action of a leaf spring on the cam carried by the drag cup. The cam in forced extended position operates a microswitch to energize the solenoid and one of the brake disc supporting plates acts as an armature and is moved longitudinally against spring opposition to release the friction disc brake from any braking action on the output shaft. This continues until a cut off of power to the A. C. motor, after which the cam is returned quickly to normal and the microswitch is opened and the brake is again quickly applied by its spring to brake the output portion of the shaft. In both instances, whether the motor rotor supporting portion of the shaft is common to the output portion as in Figure 2, or a separate shaft as in Figure 1 the center line of the rotating shaft is common throughout.

We claim:

1. In combination in a rotary shaft actuator, a housing, an A. C. motor comprising a stator, a rotor radially spaced therefrom, a rotary shaft supported by said housing including a rotor supporting portion and an output portion, braking means comprising a pair of longitudinally spaced plates splined to the output portion of said shaft, one of said plates being magnetic and axially movable on said shaft, a series of friction brake discs disposed between said plates longitudinally, some of which are splined to said housing and some of which are splined to the output portion of said shaft, spring means for normally compressing said discs to brake the output shaft portion against rotation, a normally deenergized D. C. current supplied electromagnet comprising a coil and a flux responsive non-permanent magnet armature longitudinally splined to the rotor supporting portion of said shaft to be axially movable thereon and normally longitudinally spaced from one of the plates of said brake assembly, said armature being located in a flux path including said magnetic plate, a normally open plunger operated microswitch for supplying D. C. current to energize said electromagnet, a drag cup mounted for rotation in said housing and mechanically free of said rotor and its supporting shaft, part of said drag cup being disposed in spaced relation between said rotor and stator, a cam carried by said drag cup, spring means for normally centering said cam to be out of engagement with said microswitch plunger, said drag cup, upon starting of said A. C. motor, being subjected to electrical forces to be rotated so as to rotate said cam to close the microswitch to supply D. C. current to said electromagnet to magnetically attract and slidably move the adjacent plate of said brake assembly against the action of its disc compressing spring means, to release the braking action on the output portion of said shaft and establish a magnetic coupling drive between said splined non-permanent magnet plate and its adjacent magnetic brake assembly armature splined to said output shaft portion to drive the latter, said drag cup cam, upon stopping of current supply to the stator of said A. C. motor being spring centered away from said microswitch plunger to open the switch and deenergize said electromagnet to disengage said magnetic coupling and the brake releasing means.

2. In combination in a rotary shaft actuator, a housing, a motor comprising a stator, a rotor radially spaced therefrom, a rotary shaft supported by said housing including a rotor supporting portion and an output portion, a friction disc brake assembly longitudinally splined to the output portion of said shaft and to said housing to be axially movable, spring means for normally braking said output shaft portion against rotation, a normally deenergized electromagnet comprising a coil and a flux responsive non-permanent magnet armature longitudinally splined to the rotor supporting portion of said shaft to be axially movable thereon and normally longitudinally spaced from said brake assembly, a normally open switch for supplying current to energize said electromagnet, a drag cup mounted for rotation in said housing and mechanically free of said rotor and its supporting shaft, part of said drag cup being disposed in spaced relation between said rotor and stator, a cam carried by said drag cup, spring means for normally centering said cam away from said microswitch, said drag cup, upon starting of said motor, being subjected to electrical forces to be rotated so as to rotate said cam to close the switch to supply current to said electromagnet to magnetically attract and slidably move said brake assembly against the action of its spring means, to release the braking action on output portion of said shaft and establish a magnetic coupling drive between said splined non-permanent magnet armature and said brake assembly splined to said output shaft portion to drive the latter.

3. In combination in a rotary shaft actuator, a housing, a motor comprising a stator, a rotor radially spaced therefrom, a rotary shaft supported by said housing including a rotor supporting portion and an output portion, friction disc brake assembly longitudinally splined to the output portion of said shaft and to said housing to be axially movable, spring means for normally braking said output shaft portion against rotation, a normally deenergized electromagnet comprising a coil and a flux responsive non-permanent magnet armature longitudinally splined to the rotor supporting portion of said shaft to be axially movable thereon and normally longitudinally spaced from said brake assembly, a normally open switch for supplying current to energize said electromagnet, a drag cup mounted for rotation in said housing and mechanically free of said rotor and its supporting shaft, part of said drag cup being disposed in spaced relation between said rotor and stator, a cam carried by said drag cup, spring means for normally centering said cam away from said switch, said drag cup, upon starting of said motor, being subjected to electrical forces to be rotated so as to rotate said cam to close the switch to supply current to said electromagnet to magnetically attract and slidably move said brake assembly against the action of its spring means, to release the braking action on the output portion of said shaft.

4. In combination in a rotary shaft actuator, a housing, a motor comprising a stator, a rotor radially spaced therefrom, a rotary shaft supported by said housing including a rotor supporting portion and an output portion, a friction disc brake assembly longitudinally splined to the output portion of said shaft and to said housing to be axially movable, spring means for normally braking said output shaft portion against rotation, a normally deenergized electromagnet comprising a coil and a flux responsive non-permanent magnet armature longitudinally splined to the rotor supporting portion of said shaft to be axially movable thereon and normally longitudinally spaced from said brake assembly, a normally open switch for supplying current to energize said electromagnet, a drag cup mounted for rotation in said housing and mechanically free of said rotor and its supporting shaft, part of said drag cup being disposed in spaced relation between said rotor and stator, a cam carried by said drag cup, spring means for normally centering said cam away from said switch, said drag cup, upon starting of said motor, being subjected to electrical forces to be rotated so as to rotate said cam to close the switch to supply current to said electromagnet to magnetically attract and slidably move said brake assembly against the action of its spring means, to release the braking action on output portion of said shaft, said drag cup cam, upon stopping of current supply to said motor, being spring centered away from said microswitch plunger to open the switch and deenergize said electromagnet to disengage said brake releasing means and permit the spring of said brake assembly to brake the output portion of said shaft means.

5. In combination in a rotary shaft actuator, a housing, an A. C. motor comprising a stator, a rotor radially spaced therefrom, a rotary shaft supported by said housing for carrying said rotor, an output shaft in non-driven coaxial alignment therewith, braking means comprising a pair of longitudinally spaced plates longitudinally splined to said output shaft, one of said plates being magnetic and axially movable on said shaft, a series of friction brake discs disposed between said plates, some of which are splined to said housing, and some of which are splined to said output shaft, spring means for normally compressing said discs to brake said output shaft, against rotation, a normally deenergized D. C. current supplied electromagnet comprising a coil and a flux responsive non-permanent magnet armature longitudinally splined to the rotor supporting shaft to be axially movable and normally longitudinally spaced from one of the plates of said brake assembly, a normally open plunger operated microswitch for supplying D. C. current to energize said electromagnet, a drag cup mounted for rotation in said housing and mechanically free of said rotor and its supporting shaft, part of said drag cup being disposed in spaced relation between said rotor and stator, a cam carried by said drag cup, spring means for normally centering said cam to be out of engagement with said microswitch plunger, said drag cup, upon starting of said A. C. motor, being subjected to electrical forces to be rotated so as to rotate said cam to close the microswitch to supply D. C. current to said electromagnet to magnetically attract and slidably move the adjacent magnetic plate of said brake assembly against the action of its spring means, to release the braking action on said output shaft and establish a magnetic coupling drive between said splined non-permanent magnet plate and its adjacent splined brake assembly plate splined to said output shaft to drive the latter, said drag cup cam, upon stopping of current supply to said motor, being spring centered away from said microswitch plunger to open the switch and deenergize said electromagnet to disengage said magnetic coupling and the brake releasing means.

OMAR C. WALLEY.
ROBERT L. ANDERSON.

References Cited in the file of this patent
UNITED STATES PATENTS

| Number | Name | Date |
|---|---|---|
| 665,318 | Garrett | Jan. 1, 1901 |
| 1,134,739 | Handy | Apr. 6, 1915 |